R. E. ADREON.
BALL AND SOCKET PIPE JOINT.
APPLICATION FILED AUG. 10, 1906.
1,001,117.
Patented Aug. 22, 1911.
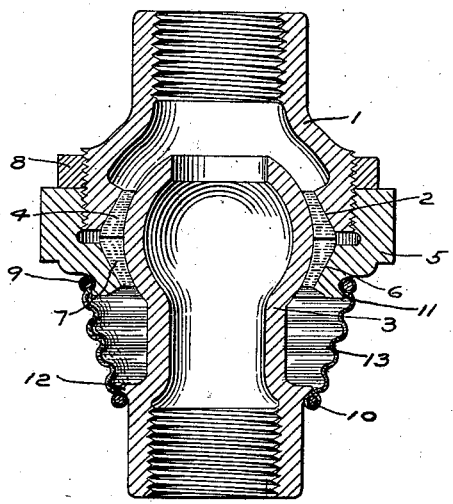
WITNESSES
INVENTOR
Robert E. Adreon
by E. A. Wright
Att'y.

UNITED STATES PATENT OFFICE.

ROBERT ENOS ADREON, OF ST. LOUIS, MISSOURI, ASSIGNOR TO WESTINGHOUSE AUTOMATIC AIR & STEAM COUPLER COMPANY, OF ST. LOUIS, MISSOURI, A CORPORATION OF ILLINOIS.

BALL-AND-SOCKET PIPE-JOINT.

1,001,117.      Specification of Letters Patent.      Patented Aug. 22, 1911.

Application filed August 10, 1906. Serial No. 330,025.

*To all whom it may concern:*

Be it known that I, ROBERT E. ADREON, a citizen of the United States, residing at St. Louis, in the State of Missouri, have invented new and useful Improvements in Ball-and-Socket Pipe-Joints, of which the following is a specification.

This invention relates to ball and socket joints for pipes wherein it is necessary to preserve a substantially fluid tight connection, and at the same time provide for a considerable amount of flexibility between the adjacent pipe sections.

The principal object of my improvement is to simplify the construction and provide a joint which shall be efficient and durable in its operation; and with this object in view the main feature of my invention comprises an improved form of packing and means for clamping and adjusting the same between the ball section and the socket section of pipe to maintain a fluid tight joint and allow a sufficient flexibility of movement.

Another feature of my improvement comprises a flexible dust shield which surrounds the joint over the exposed portion of the packing and prevents the access of dirt and dust thereto.

In the accompanying drawing, which illustrates in central section a form of ball and socket pipe joint embodying my improvements, the socket section 1 is provided with an outwardly flaring or conical surface 2, into which the ball section 3 projects, but of greater diameter than the ball so that the outer surface of the ball does not engage therewith. Between the flaring surface of the socket section and the ball is located a packing ring 4, having a corresponding outer inclined or conical surface engaging the socket section, and an inner concave surface for engaging the outer spherical surface of the ball. Mounted on the socket section, preferably by a screw threaded connection, is a gland 5 having a reversely-flared or inclined surface 6, preferably of substantially the same dimensions as the surface 2, and between the gland and the ball is located the packing ring 7 similar to packing ring 4 but tapering in the reverse or opposite direction. In this way, the packing rings are placed with their bases or thick ends adjacent to each other, and substantially in a plane with the center of the ball, so that, as the gland is screwed up, there is a wedging action which tightens both packing rings between the outer spherical surface of the ball and the inclined surfaces of the socket piece and the gland. As the packing rings wear, due to the movement of the ball therein, the gland may be adjusted to take up such wear and maintain a perfectly fluid tight joint. A lock nut 8 may be employed for fixing the adjustment of the gland on the socket section.

The packing rings are preferably formed of a hard non-metallic substance, such as vulcabeston or a composition of hardened rubber and asbestos, or other fibrous material, and may be in two separate continuous rings which facilitates the application to the ball, or the rings may be formed integral and split if desired.

In order to prevent the access of dirt and dust to the exposed portion of the packing, a flexible hood or shield 13 is located around the joint and is preferably formed of fluted or corrugated rubber, duck, or other fibrous material. This hood may be conveniently held in position by means of spring clamping rings 9 and 10 placed over the shoulders 11 and 12 formed on the sections of the joint. In this manner the entrance of dirt into the joint and around the packing is prevented, and a tight and durable joint is maintained.

What I claim as new and desire to secure by Letters Patent, is—

1. A ball and socket pipe joint, comprising a socket section having an opening with a flaring surface, a ball section projecting therein, a packing ring having an inner concave surface and an outer inclined surface, and a gland for bodily adjusting the ring between the socket section and the ball.

2. A ball and socket pipe joint, comprising a socket section having a flaring opening, a ball extending therein, a packing ring inserted between the inclined surface of said opening and the ball, and means for tightening the packing by the bodily movement thereof.

3. A ball and socket pipe joint, comprising a socket section having a flaring opening, a section having a ball end extending into said opening, a packing ring inserted between the inclined surface of said opening and the outer spherical surface of the ball, and a gland mounted on one of the sections for bodily adjusting the packing and clamping the parts together.

4. A ball and socket pipe joint, comprising a socket section, a ball section and a packing ring of wedge form in cross-section, the base or thick portion of said ring being substantially opposite the center of the ball, and means for tightening the packing by the bodily movement thereof.

5. In a flexible pipe joint, the combination with the relatively movable sections, of a packing between said sections, a gland for clamping the packing, and a flexible shield covering the joint between one of the sections and the gland, and spring clamping rings for securing said shield to said section and to the gland.

In testimony whereof, I have hereunto set my hand.

ROBERT ENOS ADREON.

Witnesses:
N. F. NEIDERLANDER,
F. G. WILLIAMSON.